United States Patent [19]

Kwart et al.

[11] 4,333,987

[45] Jun. 8, 1982

[54] METHODS FOR BONDING DISSIMILAR SYNTHETIC POLYMERIC MATERIALS AND THE PRODUCTS INVOLVED IN AND RESULTING FROM SUCH METHODS

[76] Inventors: Harold Kwart, 203 Cheltenham Rd., Newark, Del. 19711; Seevaram N. Varadhachary, 401 Union St., Newtown, Pa. 18940

[21] Appl. No.: 105,051

[22] Filed: Dec. 19, 1979

[51] Int. Cl.$^3$ .............................................. B05D 3/06
[52] U.S. Cl. .............................. 428/419; 204/159.16; 204/159.19; 427/54.1; 427/372.2; 428/420; 428/424.6
[58] Field of Search .................... 427/54.1, 372.2; 428/419, 420, 424.6, 520; 204/159.16, 159.19

[56] References Cited

U.S. PATENT DOCUMENTS

| | | | |
|---|---|---|---|
| 3,676,283 | 7/1972 | Kehr et al. | 428/424.6 |
| 3,764,370 | 10/1973 | Bragole | 427/54.1 |
| 4,119,510 | 10/1978 | Williams | 427/54.1 |
| 4,150,167 | 4/1979 | Mathias et al. | 427/54.1 |
| 4,180,615 | 12/1979 | Bettoli | 428/424.6 |

*Primary Examiner*—John H. Newsome

[57] ABSTRACT

A method of improving the bond between dissimilar synthetic polymeric materials, such as, for example, a vinyl resin composition or material and a UV curable acrylated polyurethane resin composition or material which comprises: including in the vinyl resin material (1) at least one plasticizer for said vinyl resin, (2) an organic unsaturated chemical compound soluble or dispersible in said vinyl resin composition and of sufficiently low volatility as not to be driven off during heat processing of said synthetic polymeric materials, and (3) a free radical producer or reaction initiator; including in the UV curable acrylated polyurethane resin material a polythiol; bringing the vinyl resin material and the UV curable acrylated polyurethane resin material into contact; and exposing the vinyl resin material and the UV curable acrylated polyurethane material, while in contact, to curing conditions, whereby there is sufficient chemical inter-reaction between these dissimilar synthetic polymeric materials as to create a strong and permanent primary chemical bond therebetween, in addition to any secondary bonds, such as hydrogen bonds and/or attractive van der Waals forces. The present invention also relates to the products involved in and resulting from such methods.

25 Claims, No Drawings

METHODS FOR BONDING DISSIMILAR SYNTHETIC POLYMERIC MATERIALS AND THE PRODUCTS INVOLVED IN AND RESULTING FROM SUCH METHODS

THE FIELD OF THE INVENTION

The present invention relates to methods of making multi-layered products, and more particularly multi-layered sheet materials, such as resilient floor coverings, which comprise a vinyl resin layer and a UV curable acrylated polyurethane resin layer, wherein it is necessary that such layers be adhered together in a strong and permanent bond which resists delamination very well.

BACKGROUND OF THE INVENTION

It is well known in the making of multi-layered products, such as resilient floor, wall or ceiling coverings, or desk, table or counter tops, and the like, that it is often necessary to bond together two or more layers of dissimilar synthetic polymeric materials and that it is often difficult to obtain strong and permanent bonds between such dissimilar synthetic polymeric materials.

Such difficulties often are believed to arise in the bonding of such dissimilar synthetic materials because of the difficulties created by the differences in their surface energies. For example, if atoms from two dissimilar synthetic polymeric materials cannot get close enough to each other, perhaps because of large dissimilarities or disparities in polarity, attractive van der Waals forces cannot be adequately taken advantage of to create strong permanent bonding. Nor is it believed that hydrogen bonding can be adequately taken advantage of in such situations. Many proposals have been made hitherto to overcome such difficulties and to improve the bond between such dissimilar synthetic polymeric materials but none has been found to be completely satisfactory in all respects to date.

The present invention will be described with particular reference to the bonding of dissimilar synthetic polymeric materials, such as, for example, vinyl resins and UV curable acrylated polyurethane resins but it is to be appreciated that the principles of the present invention are equally applicable to other equivalent dissimilar synthetic polymeric materials. In the same way, the present invention will be described with specific reference to multi-layered products, such as, for example, resilient floor coverings utilizing dissimilar synthetic polymeric materials but, again, it is to be appreciated that the principles of the present invention are equally applicable to other multi-layered products which also utilize dissimilar synthetic polymeric materials.

In the manufacture of resilient floor coverings, normally, a relatively flat base layer or substrate is laid out in substantially horizontal condition. Such a base layer or substrate is usually a felted or matted fibrous sheet of overlapping, intertwined filaments and/or fibers, usually of asbestos or of natural, synthetic or man-made cellulosic origin, such as cotton or rayon, although many other forms of sheets and films or textile materials, fabrics or the like, may be used.

Upon this substantially flat, horizontally positioned base layer or substrate is then deposited or applied a substantially uniform base layer of a liquid or semi-liquid resinous composition which contains a synthetic polymeric material, usually an ungelled polyvinyl chloride plastisol and normally containing a blowing or foaming agent.

This liquid or semi-liquid plastisol vinyl resin composition is subsequently firmed or gelled at an elevated temperature to a relatively more stable condition by procedures which are conventional and well known in the art. This relatively firm, gelled plastisol may then be printed with a decorative, multicolored pattern or design in which certain predetermined areas may contain a blowing or foaming inhibitor which subsequently modifies or alters the action of the blowing or foaming agent in those certain predetermined areas. Several different printing ink compositions may be used in such procedures.

A substantially uniform wear layer usually of a clear liquid or semi-liquid resinous composition and usually comprising another ungelled polyvinyl chloride plastisol composition but generally not containing any blowing or foaming agent is then applied as a wear resistant coating to the surface of the base layer of the printed, firmed and gelled polyvinyl chloride plastisol and is subsequently gelled and firmed thereon, either as a separate operation or in a joint operation with a subsequent fusing, blowing and foaming operation of the base layer of polyvinyl chloride plastisol composition. Thus far, all is conventional and there is relatively very little difficulty in creating a strong and permanent bond or adhesion between the base layer of polyvinyl chloride plastisol composition and the wear layer which is also a polyvinyl chloride plastisol composition.

It is then frequently desired to provide a top surface coating to the surface of the polyvinyl chloride plastisol wear layer and it is often desired that such top surface coating be a UV (ultra violet) curable acrylated polyurethane resin, primarily because of its superior physical and chemical characteristics and properties. However, in many instances, it is found that the adhesion or bond between the vinyl resin wear layer and the UV curable acrylated polyurethane resin top surface coating is not as strong or as permanent as desired or required, especially in the final product. It is believed that such lack of strength and of permanency or lack of suitable resistence to delamination is due in part to the fact that the wear layer and the top surface coating are dissimilar synthetic polymeric materials.

PURPOSES AND OBJECTS OF THE INVENTION

It is therefore a principal purpose and object of the present invention to provide for methods of improving the bond between dissimilar synthetic polymeric materials, and particularly between a vinyl resin material and a UV curable acrylated polyurethane resin material, whereby a strong, permanent bond is created between such materials which will resist delamination very well.

BRIEF SUMMARY OF THE INVENTION

It has been found that such principal purpose and object, as well as other principal purposes and objects which will become clearer from a further reading and understanding of this disclosure, may be achieved by forming a layer comprising a vinyl resin, one or more plasticizers for the vinyl resin, a relatively non-volatile organic olefinically or acetylenically unsaturated chemical compound soluble or dispersible in the vinyl resin layer and of sufficiently low volatility as not to be driven off during elevated temperature heat processing of the vinyl resin layer, and a free radical producer or reaction initiator; forming a layer comprising a UV curable acrylated polyurethane resin and a polythiol; bringing the vinyl resin layer and the UV curable acrylated polyurethane resin layer into contact; and exposing the vinyl resin layer and the UV curable acrylated polyurethane resin layer, while in contact, to curing conditions, whereby there is sufficient chemical interreaction between the vinyl resin layer and the UV curable acrylated polyurethane resin layer as to provide a strong and permanent bond therebetween, in addition to any secondary bonds such as hydrogen bonds and attractive van der Waals forces, such strong and permanent bonds comprising primary chemical bonds very well capable of resisting delamination.

DESCRIPTION OF PREFERRED AND TYPICAL EMBODIMENTS

THE BASE LAYER OR SUBSTRATE

The specific base layer or substrate which is used to illustrate the preferred and typical embodiments of the present invention do not relate to the essence of the inventive concept and no specific or detailed description thereof is deemed necessary. In many cases, it may be omitted entirely but, customarily, it is a conventional felted or matted fibrous sheet of overlapping, intermingled fibers and/or filaments, usually of mineral origin, such as asbestos fibers, or of cellulosic origin, such as cotton or rayon, although many other forms of sheets, films, or fabrics, and many other fibers and/or filaments of natural, synthetic or man-made origin, may be used, as described in United States Pat. Nos. 3,293,094 and 3,293,108 to Nairn et al.

THE BASE SYNTHETIC POLYMERIC LAYER

The specific base synthetic polymeric layer which is used to illustrate the present invention does not relate to the essence thereof and it is sufficient to state that it may be any potentially foamable or non-foamable resinous composition known to the art but that, although a plastisol of polyvinyl chloride is preferred and is typical, many other synthetic resins are also of use not only as plastisols, but also as organosols or as aqueous latices.

Typical of the plasticizers which are used in the formation of polyvinyl chloride plastisols are dioctyl phthalate, tricresyl phosphate, butyl benzyl phthalate, dibutyl sebacate, didecyl adipate, dioctyl sebacate, and many others cited in the previously mentioned United States Patents, generally in conventional amounts and percentages set forth in such patents.

THE VINYL RESIN WEAR LAYER

The specific vinyl resin which is used in the preparation of the wear layer does not relate to the essence of the present invention. Although a polyvinyl chloride homopolymer or a blend of two or more polyvinyl chloride homopolymers in the form of a plastisol is the preferred and typical embodiment, many other vinyl resins, either in the form of a plastisol, or an organosol or an aqueous latex, are of use, such as, for example, a vinyl chloride-vinyl acetate copolymer, a vinyl chloride-vinylidene chloride copolymer, or copolymers of vinyl chloride with other vinyl esters, such as vinyl butyrate, vinyl propionate, or alkyl substituted vinyl esters, and the like. Other synthetic polymers are also of use.

Substantially any vinyl resin wear layer will suffice, such as those disclosed in the previously mentioned United States Patents, with the modification that there also be included in the formulation from about 0.5 percent to about 10 percent by weight, and preferably from about 2 percent to about 8 percent by weight, of a relatively non-volatile olefinically or acetylenically unsaturated organic chemical compound readily soluble or dispersible in the vinyl resin wear layer and of sufficiently low volatility as not to be driven off during subsequent elevated temperature heat or other processing of the vinyl resin wear layer, and from about 0.04 percent to about 2 percent by weight, and preferably from about 0.1 percent to about 1 percent by weight, of a free radical producer or reaction initiator, in addition to the aforementioned plasticizer or plasticizers and other conventional ingredients of the vinyl resin wear layer.

THE UNSATURATED CHEMICAL COMPOUND

Substantially any olefinically or acetylenically unsaturated chemical compound can be used as the additive to the vinyl resin wear layer, provided it is soluble or dispersible therein and possesses sufficiently low volatility and will not be driven off from the vinyl resin wear layer during elevated temperature heat processing or other processing subsequently employed and also provided it is capable of reacting with thiyl radicals ($\cdot$S—) in a radical addition process wherein the thiyl radicals are derived from polythiols containing two, three, four or more thiol functions (—SH) which are included in the UV curable acrylated polyurethane resin composition to be described in greater detail hereinafter and to which the vinyl resin wear layer is to be adhered and bonded.

Unsaturated triglycerides, that is, derivatives of glycerol wherein the hydroxy groups have been esterified by unsaturated acids are of particular use within the principles of the present invention. Examples of suitable unsaturated fatty acids which are readily available include: undecylenic acid, palmitoleic acid, oleic acid, riciboleic acid, petroselinic acid, vaccenic acid, linoleic acid, linolenic acid, eleostearic acid, licanic acid, pinaric acid, tariric acid, gadoleic acid, arachidonic acid, cetoleic acid, erucic acid, selacholeic acid, nervonic acid, and other unsaturated acids which may be mentioned hereinafter.

All of the hydroxy groups of the glycerol need not be esterified by the same unsaturated acis but two or more different unsaturated acids may be present in the esterification process. And, it is not necessary that all three hydroxyl groups of the glycerol be esterified. In many cases, only one or two of the hydroxy groups need to be esterified by the unsaturated acid or acids, thus yielding monoglycerides and/or diglycerides.

Although glycerol is the preferred and typical polyol to be esterified by the unsaturated acid or acids, other polyols are also capable of utilization within the principles of the present invention. Diols or glycols, such as ethylene glycol, propylene glycol, trimethylene glycol, etc., are also of use, as well as higher polyhydroxy alcohols, such as erythritol, pentaerythritol, etc., for the esterification with the unsaturated acid or acids to yield the corresponding mono-esters or diesters or polyesters. Again, different unsaturated acids may be employed in such esterification processes.

Where the unsaturated acids referred to previously are not of high volatility and will not be driven off during conventional heat or other processing of the vinyl resin wear layer, such as in the case particularly of ricinoleic acid, oleic acid, palmitoleic acid, linoleic acid, and linolenic acid, they may be used as such, provided their acidity is not such as to constitute a a deleterious or objectionable effect upon the vinyl resin wear layer or upon other adjacent layers or other contacting or contiguous materials.

Oils and fats which are soluble or dispersible in the vinyl wear layer and have sufficiently high boiling points and low volatility are also of use. Plant, vegetable, animal and marine drying oils are of particular applicability. Such would include raw or dehydrated castor oil, linseed oil, oiticica oil, soya bean oil, tung oil, safflower oil, tall oil, fish oil. cottonseed oil, corn oil, perilla oil, etc. All of these oils contain high percentages of unsaturated acids and all have Iodine Values in excess of about 80 and in some instances up to 200 or even more. Oils and fats, other than drying oils, are also suitable for application within the principles of the present invention, where such oils or fats are soluble or dispersible in the vinyl resin wear layer, have the necessary high boiling points and low volatilities, are unsaturated and possess Iodine Values in excess of about 80. Such would include, for example, olive oil, peanut oil, sperm oil, rape or rapeseed oil, etc.

Other unsaturated esters of lower molecular weight unsaturated acids, such as, for example, maleic acid and fumaric acid esters, of suitable solubility or dispersibility and of relatively high boiling points and/or low volatility are also of applicability. Examples of such lower molecular weight unsaturated acids are maleic and fumaric acids, acrylic acid, methacrylic acid, propiolic acid, crotonic acid, isocrotinic acid, citraconic acid, mesaconic acid, cinnamic acid, allocinnamic acid, angelic acid, tiglic acid, elaidic acid, vinyl acetic acid, etc. Saturated or unsaturated hydroxy compounds may be used in such esterification processes with such unsaturated acids to yield the esters having the requisite unsaturation.

Unsaturated esters derived from unsaturated alcohols and fatty acids are also of value and of use in the application of the principles of the present invention. Examples of such unsaturated alcohols include, as illustrative but not limitative, 2-propen-1-ol (allyl alcohol), 2-methyl-2-propenol-1-ol (methallyl alcohol), 2-buten-1-ol (crotyl alcohol), 3-buten-1-ol, 3-buten-2-ol, 1-penten-3-ol (ethyl vinyl carbinol), 4-penten-1-ol, 4-penten-2-ol (allyl methyl carbinol), 2-butyn-1-ol, 3-butyn-1-ol, 3-butyn-2-ol, 2-butyn-1,4-diol, 3-butyn-1,2-diol, 1-hexen-3-ol, 3-hexen-1-ol, 4-hexen-1-yne-3-ol, 2-hepten-4-ol, etc. The fatty acids useful for esterifying such unsaturated alcohols are preferably and typically the lower fatty acids up to four or more carbon atoms. Again, such esterifying acids may be saturated or unsaturated, and as long as the resulting unsaturated esters have the required solubility or dispersibility properties and characteristics, along with sufficiently high boiling points and sufficiently low volatility values.

Where such unsaturated alcohols are not of high volatility and will not be driven off at the elevated temperature of the heat or other processing involved, and have the other herein listed required properties and characteristics, they may be used as such in the formulation of the vinyl resin wear layer.

Unsaturated amides are also applicable within the principles of the present invention, again where such unsaturated amides are able to meet the solubility or dispersibility requirements previously mentioned herein as well as the sufficiently low volatility so as not to be driven off during any elevated temperatures of subsequent heat or other processing of the vinyl resin wear layer. Such unsaturated amides include, as illustrative but not limitative, N,N-dibutyl maleamide, N,N-dioctyl crotonamide, N,N'-dibutyl maleic acid diamide, etc.

Under normal circumstances, the greater the degree of unsaturation of the unsaturated olefinically or acetylenically bonded chemical compounds, the greater is their applicability to the principles of the present invention. One measure of the degree of unsaturation of such chemical compounds is the determination of its Iodine No. (or Iodine Value) which is the number of grams of iodine that will combine with one hundred grams of the unsaturated chemical compound. Such an Iodine absorption number is an accurate and excellent measure of the unsaturated linkages present in the fat, oil, unsaturated acid, or other chemical compound being evaluated. Within the scope of the present invention, it has been found that Iodine Values in excess of about 80, and preferably above about 125, are utilizable.

THE PLASTICIZERS

The plasticizers which are incorporated in the formulation of the vinyl resin wear layer are conventional and may be selected from many well-known plasticizers now available commercially. A few have been named previously herein as exemplary of a vast number of other suitable plasticizers. The particular plasticizer which is selected does not relate to the essence of the present inventive concept. Such plasticizer or plasticizers are present in conventional amounts and concentrations.

THE FREE RADICAL PRODUCER OR REACTION INITIATOR

In addition to the unsaturated chemical compound, the plasticizer or plasticizers, and other desired or required additives, there is also included in the formulation of the vinyl resin wear layer from about 0.04 percent to about 2 percent by weight, and preferably from about 0.1 percent to about 1 percent by weight, of a free radical producer or reaction initiator. The particular free radical producer or reaction initiator which is selected for the application of the principles of the present invention do not relate to the essence of the inventive concept but depends upon factors such as the particular elevated temperature heat processing conditions which exist in the manufacture of a specific product. In other words, the free radical producer or reaction initiator must be activated at a particular temperature and time in the manufacturing process and not prematurely or too late or not at all. Examples of typical and preferred free radical producers or reaction initiators are benzoyl peroxide, lauroyl peroxide, dicumyl peroxide, and many others which are available commercially. These would include not only per-compounds such as organic peroxides but also hydroperoxides, dialkyl peroxy dicarbonates, and other peroxy compounds, such as t-butyl peroxy acetate, t-butyl peroctoate, t-butyl peroxy-2-ethylhexanoate, t-butyl perbenzoate, and many others.

FORMATION AND GELLING OF THE VINYL RESIN WEAR LAYER

The vinyl resin wear layer formulation including one or more plasticizers for the vinyl resin, together with fillers, stabilizers, etc., and containing the olefinically or acetylenically unsaturated chemical compound and the free radical producer or reaction initiator is then cast or formed on the surface of the previously mentioned base synthetic polymeric firmed and gelled plastisol composition of polyvinyl chloride.

The vinyl resin wear layer has a substantially uniform thickness normally in the range of from about 2 mils to about 30 mils or more. The vinyl resin wear layer is then gelled and firmed, either in a separate operation at an elevated temperature of from about 240° F. to about 430° F. for a period of time of from about 1 minute to about 4 minutes, or in a combined operation, together with a fusion and blowing or foaming procedure, if a blowing or foaming agent was originally included in the formulation of the base synthetic polymeric layer. Such fusion and blowing temperatures are normally in the range of from about 270° F. to about 450° F. and extend over a period of time of from about 2 minutes to about 10 minutes, and preferably from about 3 minutes to about 8 minutes.

The above temperature ranges indicate the normal elevated temperature heat processing ranges employed for the application of the principles of the present invention and are determinative of the particular unsaturated chemical compound selected to be included in the particular vinyl resin wear layer to be used in the particular application of the principles of the present invention. This is dictated by the fact that such unsaturated chemical compound should have a boiling point higher than the particular heat processing temperature involved and have a sufficiently low volatility that it is not driven off from the vinyl resin wear layer during such heat processing.

THE TOP SURFACE COATING

The specific ultraviolet (UV) curable acrylated polyurethane which is used in the formulation of the top surface coating which is applied to or formed on the vinyl resin wear layer does not relate to the essence of the present invention and may be selected from a relatively large group of presently available acrylated polyurethanes.

THE UV CURABLE ACRYLATED POLYURETHANES

Modified polyurethanes, such as the ultraviolet curable acrylated polyurethanes, may be prepared by several different manufacturing methods, one preferred and typical manufacturing method using three basic components: (1) a UV reactive polymer; (2) a diluent system composed of miltifunctional acrylate esters (and occasionally monofunctional acrylic esters); and (3) a photoinitiator system.

Such modified or acrylated polyurethanes are well known in the prior art and specific detailed description of conventional methods of their manufacture is not believed necessary. It is believed sufficient to state that additional details of such manufacturing methods, and particularly the polyisocyanates, the polyfunctional compounds (especially the polyols), and the hydroxyalkyl acrylates used therein are to be found in related, copending U.S. patent applications Ser. Nos. 023,106 and 023,107, filed Mar. 23, 1979.

Substantially the sole difference between such prior art methods of manufacturing such modified or UV curable acrylated polyurethanes is the modification that there be included in the final formulation from about 1 percent to about 10 percent by weight, and preferably from about 2 percent to about 8 percent by weight of a polythiol or polymercaptan containing at least 2, 3, 4 or more —SH functions.

THE POLYTHIOL OR POLYMERCAPTAN

The particular polythiol or polymercaptan containing at least 2, 3, 4 or more —SH functions which is selected for the application of the principles of the present invention depends primarily on the heat processing temperatures and conditions which exist in the manufacture of the specific product involved, upon the subsequent use and intended purpose of such specific product, upon the specific physical and chemical properties and characteristics desired in such specific product, and so on. The particular polythiol may be selected from a relatively large group of such sulfur-containing compounds presently available commercially. Such group includes the following, as illustrative of such compounds but not limitative thereof.

2,2'-dimercapto diethyl ether
Dipentaerythritol hexa(3-mercaptopropionate)
Dithiolterephthalic acid
Glycol dimercapto acetate
Glycol dimercapto propionate
Pentaerythritol tetra(3-mercaptopropionate)
Pentaerythritol tetrathioglycolate
Polyethylene glycol dimercapto acetate
Polyethylene glycol di(3-mercaptopropionate)
Trimethylolethane tri(3-mercaptopropionate)
trimethylolethane trithioglycolate
Trimethylolpropane tri(3-mercaptopropionate)
Trimethylolpropane trithioglycolate
Ethylene dimercaptan
1,3-propanedithiol
1,4-butanedithiol
glycerol dimercaptopropionate Curing conditions for the UV curable acrylated polyurethanes differ from those employed for more conventional polyurethanes in that such acrylated polyurethanes are cured by being passed thru an actinic radiation source such as an ultraviolet lamping unit. Radiation curing by electron beam, gamma and x-ray treatment, and other suitable radiation sources may be employed but must be used at relatively low energy levels, inasmuch as they are essentially examples of very high energy irradiation techniques leading to extremely rapid polymerization. Ultraviolet radiation is the preferred and typical source. In the presence of photoinitiators, such radiation sources induce a photochemical reaction which produces free radicals capable of inducing polymerization. Sources of ultraviolet radiation may be mercury vapor arc lamps, plasma arcs, pulsed xenon lamps and carbon arcs. Mercury vapor arc lamps are preferred and typical, preferably at medium pressure, rather than high pressure or low pressure. Specific wavelengths of light which are most effective will vary, depending primarily upon the particular polyurethane top surface coating formulation used and the particular photosensitizer employed. It is also to be appreciated that in some instances, combinations of thermal curing and radiation curing conditions may be used.

During the curing conditions to which the ultraviolet curable acrylated polyurethane resin is exposed, there is sufficient chemical inter-reaction between the olefinically or acetlyenically unsaturated chemical compound in the vinyl resin wear layer and the polythiol or polymercaptan in the acrylated polyurethane resin top surface coating as to create a strong and permanent primary chemical bond between the two layers of dissimilar synthetic polymeric materials. Such, of course, is additional to any existing secondary bonds or forces, such as hydrogen bonds or attractive van der Waals forces.

The fundamental chemical reaction producing the strong bonding linkage between the vinyl resin wear layer and the acrylated polyurethane resin layer is initiated by carbon and/or oxy free radicals formed via the decomposition of the free radical producer or reaction initiator (normally an organic peroxide or hydroperoxide) in the vinyl resin wear layer.

A carbon or oxy free radical reacts with an —SH (thiol) function which has somehow crossed the boundary into the vinyl resin wear layer from the acrylated polyurethane resin layer, while part or all of the remainder of the polythiol or polymercaptan molecule which it comprises is tied by strong chemical bonds to the acrylated polyurethane layer in which formulation it was originally included. The reaction between the carbon or oxy free radical (R· or RO·) and the —SH group which has migrated into the vinyl resin wear layer or its boundaries is known as a hydrogen atom-abstraction giving rise to a thiyl (·S—) radical, as expressed by the following equation:

R·+HS—→RH+·S—

The thiyl radical is capable of rapid addition to an olefinic or acetylenic unsaturated compound present in the formulation of the vinyl resin wear layer, as expressed by the following equation:

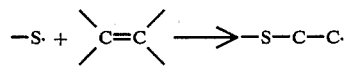

The carbon free radical is fully capable of continuing the chain reaction, as expressed in the above chemical equations, until terminated in a bimolecular recombination step, such as expressed in the following equation:

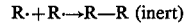

R·+R·→R—R (inert)

In this fashion, all —SH functions in the acrylated polyurethane resin layer which have diffused into or have been dissolved into the vinyl resin wear layer or its boundaries with the acrylated polyurethane resin layer have been incorporated in a sulfur-carbon bond of great strength between the vinyl resin wear layer and the acrylated polyurethane resin layer. This strong chemical bond is the source of the excellent adhesion realized by such an anchoring chemical reaction.

In the possible event that the applied and adhered top surface coating of an ultraviolet curable acrylated polyurethane is to be subsequently cured in a combined operation involving the use of an actinic radiation source together with a thermal curing operation at elevated temperatures, it is to be observed that the temperatures of such a thermal curing operation be preferably within the ranges previously set forth for the blowing or foaming and fusing operations on the synthetic polymeric resins used, or lower, but not higher.

The present invention will be further described with particular reference to the following specific working examples, wherein there are disclosed many preferred and typical embodiments of the present inventive concept. However, it is to be pointed out that such specific working examples are primarily illustrative and not limitative of the broader aspects of the present inventive concept and that other specific materials, chemicals, processes, etc., may be employed without departing from the scope and the spirit of the appended claims.

EXAMPLE I

The base layer or substrate comprises a relatively flat, 0.040 inch thick fibrous sheet of felted, matted asbestos fibers with an acrylic resin smoothing or leveling coating thereon. The asbestos fibrous sheet is coated substantially uniformly to a wet thickness depth of about 0.015 inch with the following foamable polyvinyl chloride plastisol composition as the base synthetic polymeric layer:

|  | Parts |
| --- | --- |
| Polyvinyl chloride, low mol. wt., general purpose, dispersion resin, inh. viscosity 0.99 (ASTM 1243-66) | 30.2 |
| Polyvinyl chloride, med. mol. wt., dispersion grade, inherent viscosity 1.0 | 8.2 |
| Polyvinyl chloride, med. mol. wt., blending resin, inherent viscosity 0.9 | 17.1 |
| Anhydrous aluminumsilicate filler | 6.9 |
| Alkyl benzyl phthalate plasticizers | 24.7 |
| Polydodecyl benzene | 7.4 |
| Azodicarbonamide blowing agent | 1.1 |
| Accelerator/stabilizer | 0.4 |
| Titanium dioxide | 2.5 |
| Dioctyl phthalate | 1.5 |
| Wetting agent | 0.03 |
| (Parts by weight) | |

Gelling and firming of the potentially foamable polyvinyl chloride plastisol composition is accomplished in a heated oven atmosphere maintained at an elevated temperature of about 300° F. for a period of time of about 3 minutes. This temperature is not that elevated as to activate or to decompose the azodicarbonamide blowing or foaming agent in the polyvinyl chloride base synthetic polymeric composition layer as to cause blowing or foaming thereof.

The gelled, firmed, potentially foamable polyvinyl chloride plastisol is then printed with a multicolored decorative design or pattern, using (1) a conventional or standard printing ink composition and (2) an inhibitor-containing printing ink composition, having the following compositions, respectively:

|  | Parts |
| --- | --- |
| Solution grade vinyl chloride-vinyl acetate copolymer (90 parts: 10 parts) | 15 |
| Methyl ethyl ketone | 85 |
| Pigment or colorant, as desired or required | |
| Solution grade vinyl chloride-vinyl acetate copolymer (90 parts: 10 parts) | 12 |
| Methyl ethyl ketone | 68 |
| Trimellitic anhydride blowing inhibitor | 20 |
| Pigment or colorant, as desired or required | |

The printed, gelled potentially foamable polyvinyl chloride plastisol is then allowed to air-dry and a polyvinyl chloride plastisol wear layer is substantially uniformly applied thereto to a wet thickness depth of about 0.015 inch. The wear layer has the following composition formulation by weight:

|  | Parts |
| --- | --- |
| Polyvinyl chloride, dispersion grade, high mol. wt. | 89.4 |
| Polyvinyl chloride, blending resin, inh. vis. 0.9 | 10.6 |
| Butyl benzyl phthalate plasticizer | 28.9 |
| 2,2,4-trimethyl-1,3-pentanediol diisobutyrate | 6.9 |

|  | Parts |
|---|---|
| Plasticizer (S-374) | 5.0 |
| Toner | 0.21 |
| Glycerol diundecylenate | 5.0 |
| Benzoyl peroxide | 0.3 |
| Dibutyl tin dilaurate | 3.0 |

Gelling and firming of the applied polyvinyl chloride plastisol wear layer takes place at an elevated temperature of about 300° F. in a heated oven atmosphere for a period of time of about 3 minutes, subsequently followed by a blowing or foaming and fusing operation at a necessarily higher temperature of about 430° F. for a period of time of about 2 minutes. Such elevated temperatures are not sufficiently high as to affect or to drive off the unsaturated glycerol diundecylenate from the vinyl wear layer.

The polyvinyl chloride resin wear layer is then coated with a substantially uniform wet thickness depth of 1½ mils of an ultraviolet curable acrylated polyurethane resin top coating surface prepared from the following materials:

| | |
|---|---|
| UV curable acrylated polyurethane Lau-24 derived from 3-NCO equivalents of methylene-bis(4-cyclohexylisocyanate), 0.9-OH equivalents of 2-hydroxyethyl acrylate, and 0.9-OH equivalents of Pluracol 410 polyether tetrol. | 26.0 gms. |
| UV curable acrylated polyurethane Lau-17 derived from 4-NCO equivalents of methylene-bis(4-cyclohexylisocyanate) and 2.4-OH equivalents of 2-hydroxyethyl acrylate | 4.4 gms. |
| Polyoxypropylene tetrol based on pentaerythritol, mol. wt. 600, hydroxyl no. 374 (Pluracol 410) | 4.6 gms. |
| Vinyl acetate | 15.0 gms. |
| To this is added: | |
| Dibutyl tin dilaurate | 5 drops |
| Isobutyl ether of benzoin | 1.5 cc. |
| Pentaerythritol tetrathioglycolate | 2.5 gms. |

The curing of the applied UV curable acrylated polyurethane resin top surface coating takes place by passage through an ultraviolet unit at a rate of about 10 feet per minute. The ultraviolet unit has a length of about 3 feet (2 lamp parallel unit, 12 inches long, 200 watts each lamp, medium pressure, mercury lamp) and a nitrogen atmosphere.

The bond between the vinyl resin wear layer and the acrylated polyurethane resin top surface layer is tested and is found to be very strong and permanent. It is well capable of resisting delaminating forces very well. Primary chemical bonds exist between the two dissimilar synthetic polymeric layers.

EXAMPLES II-IV

The procedures described in Example I are followed substantially as set forth therein with the exception that the pentaerythritol tetrathioglycolate in the acrylated polyurethane top surface layer is replaced by an equivalent stoichiometrical amount of
Example II. Trimethylol propane trithioglycolate,
Example III. Trimethylol ethane trithioglycolate, and
Example IV. Polyethylene glycol dimercaptoacetate.

The results of these Examples are generally comparable to the results obtained in Example I. Good adhesion is noted as existing between the vinyl resin wear layer and the acrylated polyurethane resin top coating. Primary chemical bonds exist between the two dissimilar synthetic polymeric layers and delamination is resisted very well.

EXAMPLE V

The procedures described in Example I are followed substantially as set forth therein with the exception that the amount of the pentaerythritol tetrathioglycolate is reduced to half the amount set forth in Example I. The results of this Example are generally comparable to the results of Example I. Good adhesion is noted as existing between the two dissimilar synthetic polymeric layers. Delamination is resisted very well. Primary chemical bonds exist as before.

EXAMPLE VI

The procedures described in Example I are followed substantially as set forth therein with the exception that the 5 parts of the glycerol diundecylenate is replaced by 5 parts of glycol undecylenate. The results of this Example are generally comparable to the results obtained in Example I. Good adhesion is noted as existing between the two dissimilar synthetic polymeric layers. Delamination is resisted very well. Primary chemical bonds are in existence between the two layers.

EXAMPLES VII-VIII

The procedures described in Example I are followed substantially as set forth therein with the exception that the proportions of the polyvinyl chloride resins in the vinyl resin wear layer formulation is changed to 50:50 and the glycerol diundecylenate is replaced by an equivalent stoichiometrical amount of dibutyl maleate (Example VII) and dibutyl fumarate (Example VIII). The results of these Examples are generally comparable to the results obtained in Example I. Good adhesion is noted as existing between the two dissimilar synthetic polymeric layers. Primary chemical bonds exist.

EXAMPLES IX-XXII

The procedures described in Example I are followed substantially as set forth therein with the exception that the glycerol diundecylenate is replaced by the following drying oils:

| Example IX. | cp castor oil | Iodine No. 88 |
|---|---|---|
| Example X. | dehydrated castor oil | Iodine No. 125-140 |
| Example XI. | "Synthenol" | Iodine No. 130 |
| Example XII. | "Synthenol GH" | Iodine No. 140 |
| Example XIII. | Raw linseed oil | Iodine No. 170-190 |
| Example XIV. | Superior linseed oil | Iodine No. 190 |
| Example XV. | Tung oil | Iodine No. 165 |
| Example XVI. | Soya bean oil | Iodine No. 140 |
| Example XVII. | Fish oil | Iodine No. 195 |
| Example XVIII. | Crude Tall oil | Iodine No. 143 |
| Example XIX. | Safflower oil | Iodine No. 145 |
| Example XX. | Oiticica oil | Iodine No. 165 |
| Example XXI. | Raw castor oil | Iodine No. 83 |
| Example XXII. | Cottonseed oil | Iodine No. 110 |

The results of these Examples are generally comparable to the results obtained in Example I. Good adhesion exists between the two synthetic polymeric layers and delamination is successfully resisted very well. Primary chemical bonds exist between the vinyl resin wear layer and the acrylated polyurethane surface layer.

EXAMPLES XXIII-XXVI

The procedures described in Example I are followed substantially as set forth therein with the exception that the glycerol diundecylenate is replaced by the following oils:

| | | |
|---|---|---|
| Example XXIII. | Olive oil | Iodine No. 85 |
| Example XXIV. | Peanut oil | Iodine No. 90 |
| Example XXV. | Rape oil | Iodine No. 94 |
| Example XXVI. | Sperm oil | Iodine No. 84 |

The results of these Examples are generally comparable to the results obtained in Example I. Good adhesion exists between the vinyl resin wear layer and the acrylated polyurethane resin top surface layer. Primary chemical bonds exist therebetween. Delamination is resisted successfully very well.

EXAMPLES XXVII–XXVIII

The procedures described in Example I are followed substantially as set forth therein with the exception that the 3 parts of dibutyl tin dilaurate is replaced by 3 parts of dibutyl tin bis(monoalkylmaleate) (Example XXVII) and by 3 parts of dibutyl tin bis(monoalkylmaleate) along with the replacement of the glycerol diundecylenate by glycol undecylenate similar to Example VI (Example XXVIII).

The results of these Examples are generally comparable to the results obtained in Examples I and VI. Good adhesion is noted between the two dissimilar synthetic polymeric layers and delamination is resisted very well. Primary chemical bonds are in existence between the two layers.

Although numerous specific Working Examples of the inventive concept have been described in great particularity, the same should not be construed as limitative of the broader aspects of the invention but as merely illustrative of specific materials and procedures which are preferred and typical. Other materials and other procedures may be used, as well as other equivalent features and aspects, without departing from the spirit and the scope of the appended claims.

What is claimed is:

1. A multi-layered construction of dissimilar synthetic polymeric materials comprising:
    a first layer of a synthetic polymeric composition comprising a vinyl resin, at least one plasticizer for said vinyl resin, an organic unsaturated chemical compound soluble or dispersible in said vinyl resin synthetic polymeric composition and of sufficiently low volatility as not to be driven off during heat processing of said multi-layered construction, and a free radical producer or reaction initiator; and
    a second layer of a synthetic polymeric composition comprising an ultraviolet-curable acrylated polyurethane resin and a polythiol capable of reacting with said organic unsaturated chemical compound in said first layer to form permanent primary chemical bonds bonding said layers together said first and second layers having been bonded together by reacting said organic unsaturated chemical compound and said polythiol.

2. A multi-layered construction as defined in claim 1 wherein said polythiol is pentaerythritol tetrathioglycolate.

3. A multi-layered construction as defined in claim 1 wherein said polythiol is trimethylol propane trithioglycolate.

4. A multi-layered construction as defined in claim 1 wherein said polythiol is trimethylol ethane trithioglycolate.

5. A multi-layered construction as defined in claim 1 wherein said polythiol is polyethylene glycol dimercaptoacetate.

6. A multi-layered construction as defined in claim 1 wherein said organic unsaturated chemical compound is an unsaturated glyceride.

7. A multi-layered construction as defined in claim 1 wherein said organic unsaturated chemical compound is glycerol di-undecylenate.

8. A multi-layered construction as defined in claim 1 wherein said organic unsaturated chemical compound is an unsaturated ester.

9. A multi-layered construction as defined in claim 1 wherein said organic unsaturated chemical compound is glycol undecylenate.

10. A multi-layered construction as defined in claim 1 wherein said organic unsaturated chemical compound is dibutyl maleate.

11. A multi-layered construction as defined in claim 1 wherein said organic unsaturated chemical compound is derived from a drying oil.

12. A multi-layered construction as defined in claim 1 wherein said organic unsaturated chemical compound is derived from a drying oil having an iodine number of at least about 80.

13. A multi-layered construction as defined in claim 1 wherein said organic unsaturated chemical compound is derived from dehydrated castor oil.

14. A multi-layered construction of dissimilar synthetic polymeric materials comprising:
    a first layer of a synthetic polymeric composition comprising
    a vinyl resin and at least one plasticizer for said vinyl resin; and
    a second layer of a synthetic polymeric composition comprising
    an ultraviolet-radiation cured acrylated polyurethane resin,
    said layers being bonded together by permanent primary chemical bonds formed of reaction products of an organic unsaturated chemical compound soluble or dispersible in said vinyl resin synthetic polymeric composition and of sufficiently low volatility as not to be driven off during heat processing of said multi-layered construction and a polythiol.

15. A method of forming a multi-layered construction of dissimilar synthetic polymeric materials comprising:
    forming a first layer of a synthetic polymeric composition comprising a vinyl resin, at least one plasticizer for said vinyl resin, an organic unsaturated chemical compound soluble or dispersible in said vinyl resin synthetic polymeric composition and of sufficiently low volatility as not to be driven off during heat processing of said multi-layered construction, and a free radical producer or reaction initiator;
    forming a second layer of a synthetic polymeric composition comprising an ultraviolet-curable acrylated polyurethane resin and a polythiol capable of reacting with said organic unsaturated chemical compound in said first layer; and
    exposing said first layer and said second layer to curing conditions, while in contact, for said ultraviolet-curable acrylated polyurethane resin, whereby said organic unsaturated chemical compound reacts with said polythiol to create strong and permanent primary chemical bonds between said layers.

16. A method as defined in claim 15, wherein said curing conditions include actinic radiation.

17. A method as defined in claim 15, wherein said curing conditions include ultraviolet radiation.

18. A method as defined in claim 15, wherein said curing conditions include a combination of actinic radiation and thermal heating.

19. A method as defined in claim 15, wherein said second layer is formed on the surface of said first layer.

20. A method as defined in claim 19, wherein said first layer is gelled or firmed prior to the formation of said second layer on its surface.

21. A method as defined in claim 20, wherein said first layer is gelled or firmed at an elevated temperature in the range of from about 240° F. to about 430° F., which temperature is insufficient to drive off said organic unsaturated chemical compound from said first layer.

22. A method as defined in claim 15, wherein said polythiol is pentaerythritol tetrathioglycolate.

23. A method as defined in claim 15, wherein said polythiol is trimethylol propane trithioglycolate.

24. A method as defined in claim 15, wherein said polythiol is trimethylol ethane trithioglycolate.

25. A method as defined in claim 15, wherein said polythiol is polyethylene glycol dimercaptoacetate.

* * * * *